Figure 1:
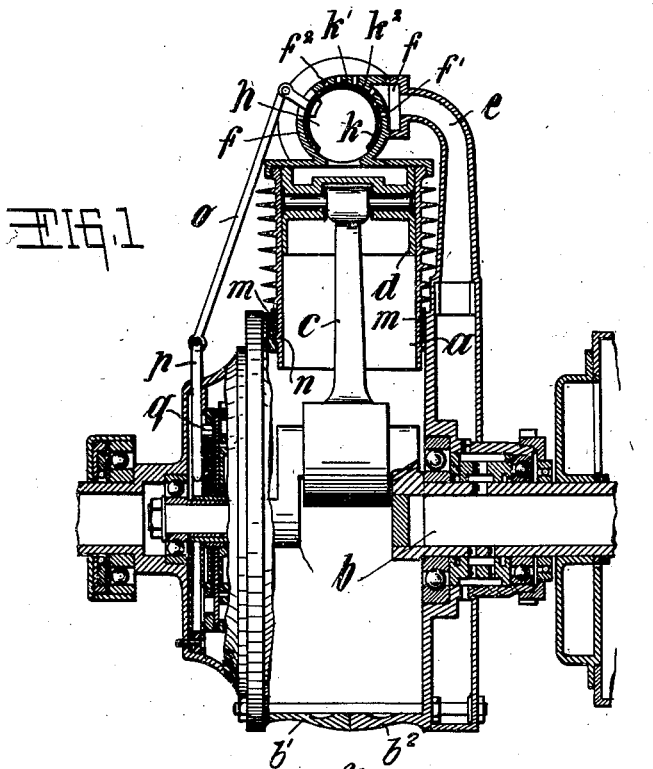

L. S. DE RICHELLE.
ROTARY INTERNAL COMBUSTION ENGINE.
APPLICATION FILED MAY 15, 1912.

1,087,259.

Patented Feb. 17, 1914.

3 SHEETS—SHEET 1.

Witnesses:
L. H. Staaden.
Anna Hoyer.

Inventor:
Louis Stas de Richelle
by Alf Uhin
Atty.

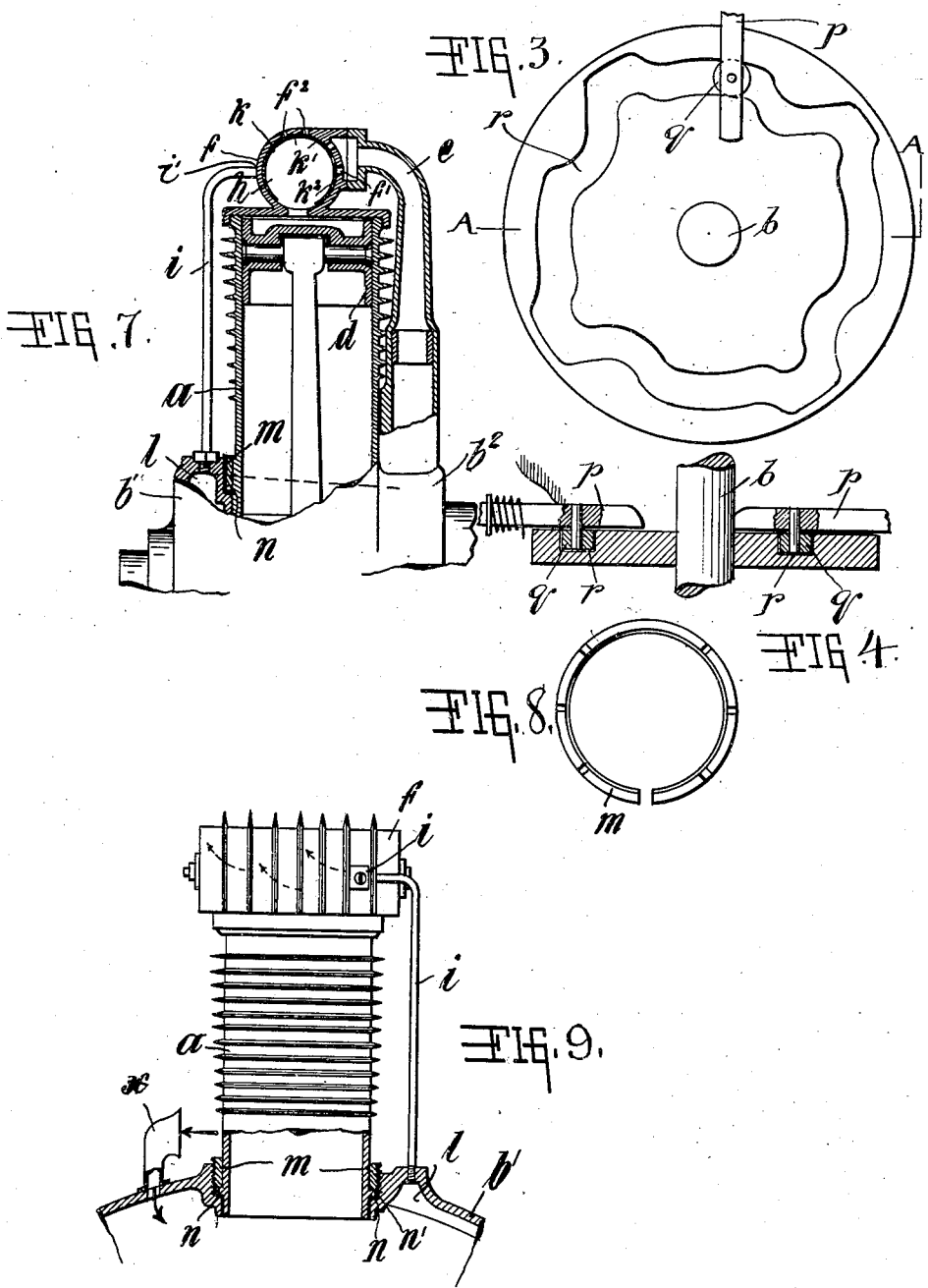

L. S. DE RICHELLE.
ROTARY INTERNAL COMBUSTION ENGINE.
APPLICATION FILED MAY 15, 1912.

1,087,259.

Patented Feb. 17, 1914.

3 SHEETS—SHEET 3.

Witnesses:
L. H. Staaden.
Anna Hoyer.

Inventor:
Louis Stas de Richelle
by Alf Ahlin
att

UNITED STATES PATENT OFFICE.

LOUIS STAS DE RICHELLE, OF GHENT, BELGIUM, ASSIGNOR TO STAS-ROTATIONSMOTOR-GESELLSCHAFT M. B. H., OF BERLIN, GERMANY.

ROTARY INTERNAL-COMBUSTION ENGINE.

1,087,259.   Specification of Letters Patent.   Patented Feb. 17, 1914.

Application filed May 15, 1912. Serial No. 697,520.

*To all whom it may concern:*

Be it known that I, LOUIS STAS DE RICHELLE, a subject of the King of Belgium, residing at Ghent, in the Kingdom of Belgium, have invented certain new and useful Improvements in Rotary Internal-Combustion Engines, of which the following is a specification.

The present invention has for its object distributing gear for internal combustion engines but more particularly for engines in which two or more radially arranged cylinders effect a circular movement around a common shaft. Such internal combustion engines with rotating cylinders present disadvantages of various kinds, as is well-known. For example engines of this kind present the defect that the distributing means used instead of valves for alternately closing and opening the admission and exhaust orifices for the fuel consist of a plurality of separate parts and are therefore very complicated. The most frequent consequence of this complicated formation of the distributing members is that they cease to form a good joint even after only a short period of continuous operation and then no longer act perfectly, even if they do not become entirely inoperative. Another defect of internal combustion engines as hitherto constructed resides in the fact that for forming the combustion chamber above the piston a relatively considerable extension of the cylinder walls is necessary. By an extension of the cylinder walls, however, the moving masses which in the case of rotary engines in particular, are extremely dangerous, are considerably increased. Finally, in the known engines of the kind indicated above there is the further defect that the lubrication which is essential in the case of long continuous operation is only possible with the assistance of extremely complicated auxiliary devices.

The present invention has for its object to provide a rotary internal combustion engine in which all the defects hitherto inherent in engines of this kind are avoided.

In particular, the object of the present invention is to avoid failure of the distributing gear even during long continued operation. This object has been attained by a special construction of the distributing gear itself and a special arrangement of this distributing gear on the cylinders of the engine. Both the construction of the distributing gear and its arrangement on the cylinder of the engine is such that the centrifugal force during the rotary movement of the cylinders tends to hold the movable parts of the distributing mechanism to their seats and thereby causes a good joint to be made without the employment of special auxiliary means for this purpose. By the special construction and arrangement of the distributing member, which allows the centrifugal force to be utilized for the said purpose, all the devices that have hitherto been required for making a good joint for the distributing members, such as springs, packing ring stuffing boxes, or the like, and also their retaining members or devices are dispensed with and the distributing member itself is rendered so simple that absolute perfection in the operation of the distributing gear is insured even during long continued uninterrupted operation. By means of a special automatic supply of the lubricant required for lubricating the movable parts of the distributing members from the reservior or other convenient collecting device and the utilization of the inner space of the distributing member as combustion chamber the operation of the distributing members as well as the operation of the internal combustion engine itself are rendered certain in every respect.

Figure 2:
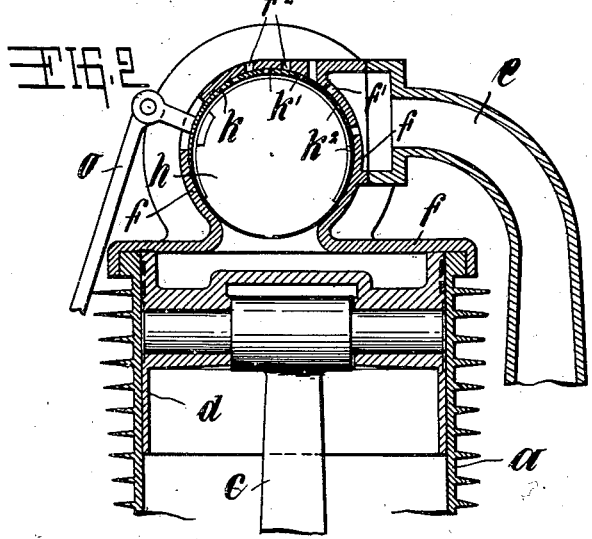
Figure 5:
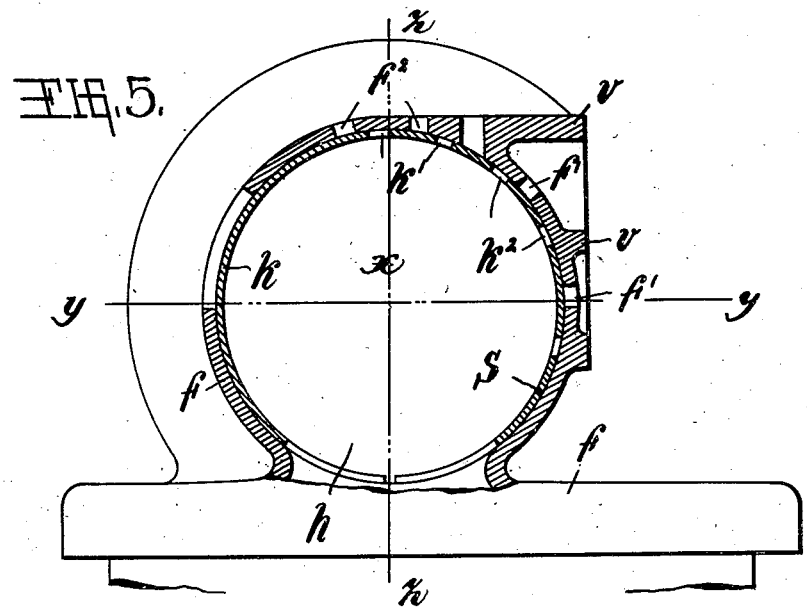
Figure 6:
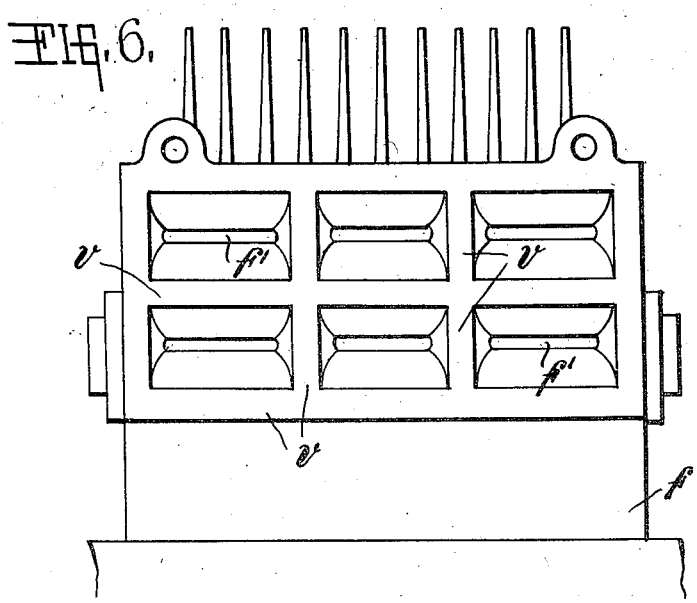

Several embodiments of the invention are illustrated by way of example in the accompanying drawing, in which:

Figure 1 illustrates a part of an axial engine with rotating cylinders in section. Fig. 2 shows the distributing mechanism on a larger scale. Fig. 3 shows an operating device for the movable parts of the distributing mechanism in plan. Fig. 4 shows the same device in section on the line A—A in Fig. 3. Figs. 5 and 6 illustrate in section and in front elevation respectively a bearing casing for the distributing member and Figs. 7 and 8 illustrate the devices for supplying the lubricant to the distributing members whereas Fig. 9 shows a ring for firmly securing the cylinder to the engine casing.

The motor comprises the crank case, which is made of two parts $b'$, $b^2$ and is adapted to rotate around a stationary shaft $b$. On the periphery of the crank case the cylinders $a$ of the engine are radially mounted. The lower or inner end of each cylinder comprises a rib $n$ which engages a groove $n'$

(Figs. 7 and 8) in the crank case. The groove $n'$ in the crank case is arranged in such a manner that the rib $n$ of the cylinder can bear on the lower projection of the groove and there finds a secure bearing while above the rib between the cylinder wall $a$ and the crank case a free space for inserting a ring $m$ is left. The ring $m$ is divided at one point (Fig. 9). This division of the ring serves on the one hand to permit of its arrangement on the cylinder over the rib and on the other hand provides for a resilient bearing of the ring on the wall of the crank case. On its outer periphery the ring $m$ is threaded while its upper side is provided with notches for the insertion of handles. If this ring $m$ is screwed between the cylinder wall $a$ and the crank case it is impossible for the cylinder to work loose. In each of the cylinders $a$ $a$ a piston $d$ connected through the piston rod $c$ to the driving shaft $b$ has a reciprocating movement. On its upper side the cylinder is closed by a cover $f$, which, as shown in Fig. 2, is made so as to form a more or less circular chamber in which the combustion takes place. The arrangement of the chamber or casing $f$ relatively to the cylinder is immaterial and may vary in accordance with the construction and the external form of the cylinder itself. One or more apertures $f'$ $f^2$ are provided in the casing $f$. These apertures may vary in size and may be made circular or elongated. As shown, elongated slots are employed and these are narrow and relatively long. Of these slots the slots $f'$ communicate with the supply pipe $e$ for the explosive mixture coming from the carbureter and the slots $f^2$ with the atmosphere.

The casing $f$ which is constructed of a material of equal strength throughout, is provided with intersecting rib-like projections $v$ at the place where the explosive mixture is introduced as shown in Figs. 2 and 5. Any desired rib-like projections can be provided and their cross section may vary as desired; they can be provided with a more or less tapering edge. These rib-like projections can also be formed in such a manner that they will run obliquely to the elongated slots and constitute a kind of receiver for the fuel introduced into the cylinder. This formation of the casing $f$, or of that part of it through which the explosive mixture is admitted, serves on the one hand to avoid deformation of the wall of the casing $f$ where it is weakened by the slots $f'$ owing to the unavoidable heating of the casing during operation, and also serves to insure a good joint between the bearing casing and the distributing members mounted in the casing and also to insure a perfectly uniform distribution of the explosive mixture. It has not hitherto been possible, either by strengthening the material throughout at the said parts of the bearing casing for the distributing member or by means of a different formation of the slots themselves to insure the necessary certainty of operation.

As already stated, the circular portion of the casing $f$ is intended for the reception of the distributing member $k$ which alternately closes and opens the inlet and exhaust ports for the explosive mixture. In accordance with my invention the distributing member is given such a form and is arranged on the cylinder of the engine in such a manner that the said distributing member is held to its seat merely by the centrifugal force due to the rotation of the cylinder so that the employment of additional means is entirely unnecessary.

In the construction illustrated in Figs. 2 and 5 the distributing member consists of a cylindrical sleeve $k$ mounted in the interior $h$ of the casing $f$ and displaceable and / or rotatable about its longitudinal axis located in the direction of rotation of the engine. The sleeve $k$ which of itself constitutes a chamber of greater or less magnitude which communicates with the interior of the cylinder, or can be caused to communicate therewith in some convenient manner, is cut away on the side toward the interior of the cylinder so that the ends of the sleeve can spring apart. In order to facilitate this springing apart of the ends of the sleeve it is preferably made of very thin material. The sleeve can, however, also be formed in such a manner that its wall gradually becomes weaker toward its cut away portion, whereby it becomes more resilient. The sleeve $k$ also comprises a similar number of apertures or slots $k'$ $k^2$ adapted to register with those provided in the casing. The openings in the sleeve are located relatively to the openings in the casing in such a manner that, according to the position of the sleeve, its internal space communicates either with the atmosphere or with the supply chamber for the explosive mixture. The arrangement of the sleeve $k$ in the casing $f$ is essential for its operation. In the first place the cut away ends of the sleeve must be located more or less symmetrically to the central vertical plane $z$—$z$, Fig. 5 of the cylinder so that during the rotation of the cylinder a uniform adherence of the sleeve to the wall of the casing is always insured. Then, it is essential that the cross section of the sleeve which acts as a cylindrical slide valve should be selected in such a manner that the centers of gravity of the two halves of the cross section of this cylindrical valve do not come in or below the horizontal plane $y$—$y$ Fig. 5 of the cylindrical valve but are as far beyond or above this plane as possible. This renders it possible to utilize the centrifugal force for obtaining a good joint in the most efficient manner, as the centrifugal force acting on the center of gravity of the two cross sections causes each half of the cylindrical slide valve to bear firmly on its entire surface. With such a construction of the distributing member it has been found that the joint between it and the casing is perfect during operation and cannot in any wise be impaired even during long continued operation. The distributing member itself (the internal space of which simultaneously serves as combustion chamber) consists only of a single part so that it is possible to replace the distributing member quickly and conveniently.

In order to reduce to a minimum the friction between the movable part of the distributing mechanism and the casing serving as guide for the distributing member and in order to prevent the generation of too much heat due to friction, lubricating oil or the like is supplied between the sleeve $k$ and the inner wall of the casing $f$. The lubricating oil is supplied through an up-pipe $i$ opening into the casing $f$. The arrangement of the discharge aperture $i'$ of the up-pipe $i$ on the casing $f$ relatively to the direction of rotation of the cylinder is important. In the construction as shown in Fig. 8 the position of the mouth $i'$ of the up-pipe $i$ for discharging the lubricating oil into the casing of the distributing member has been selected in such a manner that the oil passing from the up-pipe into the casing is distributed by the centrifugal force over the entire surface of the distributing member. In order to attain this result the mouth $i'$ of the up-pipe $i$ is located in as close proximity as possible to the foremost part of the casing in the direction of rotation of the motor. The oil entering the casing from the mouth of the pipe is discharged and uniformly distributed directly over the entire surface of the distributing member.

The oil required for lubricating the distributing member can be taken automatically by means of the up-pipe from a storage reservoir which may be arranged in the engine casing. As shown the oil thrown by the crank rod of the internal combustion engine during the running of the latter against the wall $b'$ of the engine casing is utilized for lubricating the distributing member. With this object the engine casing can be constructed in such a manner that the whole of the oil thrown onto the wall of the casing collects in a single guide channel $l$ from which it reaches the up-pipe, being carried to the parts to be lubricated by the latter.

For collecting the oil thrown off by the crank rod either a separate catching and collecting channel can be arranged in the motor casing or the casing itself can be formed as a guide channel.

The displacement of the sleeve about its longitudinal axis is effected by a rod $o$ which is pivoted directly to the sleeve $k$ and is also fixed to a slide member $p$ arranged on one side of the motor. This member $p$ carries a roller $q$ which slides in an irregular groove $r$ arranged in a plate. The cam groove corresponding to the cycle of admission, compression, explosion and exhaust is made corresponding to the ratio between the speed of rotation of the engine and that of the cam plate.

As soon as the cylinders $a$ of the engine rotate about the shaft $b$ the centrifugal force forces the distributing member (the sleeve $k$) against the inner wall of the casing $f$ in such a manner that an absolutely reliable joint is provided between the casing and the sleeve without the employment of auxiliary devices such as packing rings, springs or the like which complicate the distributing member; by the selection of more or less closely arranged narrow slot-shaped perforations the further advantage is attained that for the purpose of effecting the distribution, the sleeve $k$ need only have a relatively small movement without the free cross section for the flow through the openings being thereby smaller.

It will of course be understood that I do not wish to be limited to the embodiment as shown.

In order to admit air during the running of the engine to its casing in particular for cooling purposes ventilating inlets $x$ (Fig. 8) are arranged on the engine casing. These inlets can be of varying size and number and can be given any convenient external form. The only essential point is that they should be suited for supplying air during the running of the engine to the engine casing. The manner in which these air supplying devices are arranged and the position which they occupy is immaterial. These means can be arranged equally advantageously either on the periphery or on the side walls of the engine casing. As shown the ventilating inlets $x$ are arranged on the periphery of the engine casing $a$ in order to introduce air into the engine casing for the purpose of cooling the latter.

What I claim is:

1. An internal combustion engine comprising rotating cylinders, combustion chambers having inlet and outlet apertures and split cylindrical sleeves, one in each combustion chamber, provided with inlet and outlet apertures and arranged to be forced under the centrifugal action of the cylinders against the inner wall of its chamber.

2. An internal combustion engine comprising rotating cylinders, combustion chambers having inlet and outlet apertures, split cylindrical sleeves in said chambers provided with registering apertures and a pipe, connecting a lubricating oil chamber with the said combustion chamber so as to allow the oil to be supplied to the said combustion chamber through the centrifugal force caused by the rotation of the cylinders.

3. An internal combustion engine comprising rotating cylinders, combustion chambers having inlet and outlet apertures and split cylindrical sleeves, one in each combustion chamber provided with inlet and outlet apertures and rotatable about their longitudinal axes located in the direction of rotation of the engine, so that the sleeves are forced under the centrifugal action of the cylinders against the inner wall of their chambers.

4. An internal combustion engine comprising rotating cylinders, combustion chambers having inlet and outlet apertures and split cylindrical sleeves, one in each combustion chamber, provided with inlet and outlet apertures and with the centers of gravity of their symmetrical halves above the horizontal axial plane ($y$—$y$) so as to cause the said halves to be forced under the centrifugal action of the cylinders against the inner wall of their chambers.

In testimony whereof I have affixed my signature in presence of two witnesses.

LOUIS STAS de RICHELLE.

Witnesses:
  JULIUS STAN HEEY,
  I. M. CHEEDETIES.